United States Patent
Gerwig et al.

(10) Patent No.: US 7,373,369 B2
(45) Date of Patent: May 13, 2008

(54) ADVANCED EXECUTION OF EXTENDED FLOATING-POINT ADD OPERATIONS IN A NARROW DATAFLOW

(75) Inventors: Guenter Gerwig, Simmozheim (DE); Klaus Michael Kroener, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 10/861,151

(22) Filed: Jun. 4, 2004

(65) Prior Publication Data

US 2004/0267861 A1  Dec. 30, 2004

(30) Foreign Application Priority Data

Jun. 5, 2003  (EP) ................... 03101653

(51) Int. Cl.
*G06F 7/38* (2006.01)
(52) U.S. Cl. ................. 708/505; 708/670
(58) Field of Classification Search ........ 708/495, 708/505, 627, 629, 670, 709
See application file for complete search history.

(56) References Cited

U.S. PATENT DOCUMENTS

| | | | | |
|---|---|---|---|---|
| 4,639,886 A | * | 1/1987 | Hashimoto et al. | ......... 708/521 |
| 5,053,987 A | * | 10/1991 | Genusov et al. | ............ 708/520 |
| 5,058,048 A | * | 10/1991 | Gupta et al. | ................ 708/508 |
| 5,128,889 A | * | 7/1992 | Nakano | ...................... 708/497 |
| 5,204,829 A | * | 4/1993 | Lyu et al. | .................... 708/508 |
| 5,287,532 A | * | 2/1994 | Hunt | .......................... 712/10 |
| 5,317,526 A | * | 5/1994 | Urano et al. | ................ 708/204 |
| 5,450,607 A | * | 9/1995 | Kowalczyk et al. | .......... 712/41 |
| 5,568,412 A | * | 10/1996 | Han et al. | .................... 708/497 |
| 5,993,051 A | | 11/1999 | Jiang et al. | ............ 364/748.07 |
| 6,912,557 B1 | * | 6/2005 | North et al. | ................ 708/490 |

OTHER PUBLICATIONS

"z/Architecture Principles of Operation", SA22-7832-00 (First Edition Dec. 2000, Chapter 19).

* cited by examiner

*Primary Examiner*—Moustafa Meky
(74) *Attorney, Agent, or Firm*—Lily Neff (57) ABSTRACT

A method and system for performing floating point additive arithmetic operations of long operands in a narrow dataflow. The operands include first and second floating point numbers having first and second mantissas, respectively, the second operand greater than the first operand. The mantissas are both separated into a low portion and a high portion, the high portions are loaded into N-bit operand registers. The high portion of the first mantissa is aligned with respect to the high portion of the second mantissa, the high portions are then moved into 2N-bit registers. The low portion of the first mantissa is aligned in accordance with the alignment of the first mantissa high portion. The low portions of both mantissas are then concatenated into the registers, the first mantissa concatenated using a hold-function circuit. A 2N-bit-wide adder performs the additive arithmetic operation on the concatenated mantissas.

14 Claims, 6 Drawing Sheets

ADVANCED EXECUTION OF EXTENDED FLOATING-POINT ADD OPERATIONS IN A NARROW DATAFLOW

TRADEMARK

IBM® is a registered trademark of International Business Machines Corporation, Armonk, N.Y., U.S.A. S/390, z/Series, z/Architecture, and other names used herein may be registered trademarks, trademarks or product names of International Business Machines Corporation or other companies.

FIELD OF THE INVENTION

The present invention relates to arithmetic processing circuits in a computer system and, in particular to a circuit in a floating point processor having ADD circuitry, which is able to be used either for instructions operating operands of regular length (e.g. 64 bit) and for extended length (e.g. 128 bit), and in particular for fused multiply/ADD circuitry.

BACKGROUND

Arithmetic processing circuitry for binary numbers as known in the art typically employs floating point arithmetic in accordance with the IEEE 754 binary format, or with the Hex-Extended format standard as implemented for example in IBM S/390 floating point processing circuitry. Floating point arithmetic, used in addition, multiplication, and division, first normalizes the binary numbers to be added, multiplied, or divided by shifting the binary numbers until, for a positive number, the first non-zero digit (i.e., 1) is immediately to the left of the radix point such that the mantissa part of the binary numbers is greater than or equal to 1 and less than 2. A negative binary number will have leading ones. Thus, to normalize a negative number, the number is shifted so that the first zero is immediately to the left of the radix point.

For multiplication, the normalized binary numbers are then multiplied and their exponents are added. For division, the normalized binary numbers are divided and their exponents are subtracted. For addition and subtraction, the normalized numbers are shifted (i.e., aligned) so that their exponents are equal, then the numbers are added or subtracted, respectively.

A fused ADD/multiply (FPU) circuit of the above type and operation is disclosed in U.S. Pat. No. 5,993,051, titled "COMBINED LEADING ONE AND LEADING ZERO ANTICIPATION." An ADD circuit, which is able to be used either for instructions which operate on operands of regular length (e.g. 64 bit) or of extended length (e.g. 128 bit) is disclosed in, for example, IBM S/390 and z/Series computer systems produced in the year of 1999 or later, and in associated documentation such as "z/Architecture Principles of Operation," International Business Machines Publication No. SA22-7832-00 (First Edition, December 2000), also in form of fused Multiply/Add circuitry. The regular use of e.g. a 64-bit dataflow is referred to herein as "narrow" dataflow in view of a "longer" 128-bit operand perspective.

The Instruction of a MULTIPLY AND ADD is described in "z/Architecture Principles of Operation," International Business Machines Publication No. SA22-7832-00 (First Edition, December 2000), chapter 19.

The S/390 hardware processor architecture requires a so-called "extended" add (and subtract) operation, in which an instruction has a mantissa of 112 bits, but the fraction dataflow width is only 56 bits for the input registers and for the aligner unit (optimized for 'long' instructions).

Therein, a sum S is calculated from operands A and B:

$$S=A+B,$$

where the mantissa of the floating point number having the smaller exponent is aligned according to the exponent difference between the bigger and the smaller exponent of the floating-point number. Within a "narrow" fraction dataflow optimized for 'long' operands, an extended (or quad precision) operand is divided into two (or respectively more) parts, and a respective number of suboperations are performed, to calculate the result sum.

An example is given as follows:
Definitions:
Exp (A) LESS THAN OR EQUAL TO Exp (B)
$A=A_{high}+A_{low}$
$B=B_{high}+B_{low}$
$A_{aligned-high}$=aligned($A_{high}$)
$A_{aligned-low}$=aligned (A) i.e. $A_{aligned-low}$=aligned($A_{high}$)+aligned($A_{low}$),
$S_{high}$=high part of raw sum
$S_{low}$=low part of raw sum.

The following suboperations are performed in prior art, as given by the IBM S/390 architecture:

1. Calculate Exponent difference: the difference determines a shift amount for further alignment steps;
2. Align $A_{high}$ (shift right) by amount of exponent difference which results in $A_{aligned-high}$, i.e. the operand A's mantissa is in the range of $B_{high}$;
3. Align $A_{low}$ to the range of $B_{low}$->save as $A_{low-aligned-low}$
4. Align $A_{high}$ to the range of $B_{low}$->save as $A_{high-aligned-low}$
5. Build $A_{aligned-low}$ by concatenating $A_{low-aligned-low}$ and $A_{high-aligned-low}$
6. Add $A_{aligned-low}$ and $B_{low}$;—to get $S_{raw-low}$ and save carry_out
7. Add $A_{aligned-high}$ and $B_{high}$ and saved carry_out to get $S_{raw-high}$
8. Do Normalization—build the final normalized Sum $S_{high}$ and $S_{low}$ out of $S_{raw-high}$ and $S_{raw-low}$ (different cases, since $S_{raw}$ can have leading zeros)

This operation typically takes 13 cycles in prior art implementations, such as specified in the above IBM S/390 architecture.

The disadvantage of prior art implementations such as the IBM S/390 architecture is the high number of 13 cycles used, and the fact that the control logic required to do the above suboperations is complex, since the respective normalization procedure is complex.

For the foregoing reasons, therefore, there is a need in the art for an improved floating point adder unit and corresponding method for extended floating point ADD operations in a "narrow" dataflow.

SUMMARY OF THE INVENTION

The shortcomings of the prior art are overcome and additional advantages are provided through the provision of a method and system for performing floating-point addition of long operands in a narrow dataflow.

In particular, a method is disclosed for performing additive arithmetic operations on operands in a floating-point arithmetic unit, where the operands include a first operand and a second operand, the first operand being a first floating-point number having a first mantissa, and the second operand being a second floating-point number having a second mantissa, where the second operand is greater than the first operand, and where the precision of the floating-point arithmetic unit exceeds the precision enabled by a bit length of data input to the floating point arithmetic unit. The method includes separating the first mantissa into a high portion and a low portion, and separating the second mantissa into a high portion and a low portion; loading the high portion of the first mantissa into a first operand register and loading the high portion of the second mantissa into a second operand register, both operand registers having a data width of N bits; aligning the high portion of the first mantissa with the high portion of the second mantissa; moving the aligned high portion of the first mantissa into a sum register and moving the high portion of the second mantissa into a carry register, the sum and carry registers each having a data width of 2N bits; concatenating in the carry register the low portion of the second mantissa with the high portion of the second mantissa; aligning the low portion of the first mantissa in accordance with the aligning of the high portion of the first mantissa; concatenating in the sum register the aligned low portion of the first mantissa with the aligned high portion of the first mantissa using a hold-function multiplexing circuit; and performing an additive arithmetic operation on the aligned first mantissa and the second mantissa in an adder, the adder having a data width of 2N bits.

In preferred embodiments of the present invention, the floating point arithmetic unit is a fused multiply/add circuit.

Systems corresponding to the above-summarized methods are also described and claimed herein.

It is therefore an object of the present invention to provide a method and system for efficient addition of extended floating point operands in a narrow dataflow.

In other words, the high part of the A mantissa (Ahigh) is aligned in the "normal" way as it is done in prior art for long operations. This is done in a conventional way by using the shift amount calculated from the exponent difference between A and B, with the distinction however, that a higher exponent bit length is used, i.e. 16 bits for extended instructions relative to 8 bits for normal instructions. Then the low part of A is aligned in the next cycle with the same shift amount calculated from the high part of A plus a constant, which corresponds to the net length of the mantissa high part, for example 56 bits in a 64 bit instruction. Concurrently, when the low part of A is aligned, the previously aligned high part of A is moved into the sum register, i.e., this is done in the same cycle. Subsequently, in the next cycle a particular, simple logical function, herein referred to as "hold-OR" in case of an effective addition, or "hold-AND" in the case of an effective subtraction, the low part of A is concatenated with the high part of A in the sum register "upstream" of the main adder. This inventive hold-OR and hold-AND logic keeps the present value of the high part of A and appends the low part of A at the very end of the bit sequence of the high part of A. At the same time, the high part and the low part of the B operand can be concatenated by a fixed shift in the carry register, since there is no alignment necessary for the "bigger" operand.

The advantage is that the inventive solution as disclosed herein requires only three cycles when the operand with the higher exponent is guessed correctly, in comparison to 13 cycles required in prior art implementations.

According to the basic concept of the present invention the following execution steps are performed:

1. align $A_{high}$;
2. align $A_{low}$;
3. concatenate $A_{high}$ and $A_{low}$ by the hold-OR/hold-AND function provided by the present invention.

It should be added that the low part of B is concatenated to its high part by a fixed predetermined shift amount, since there is no alignment necessary for the larger operand.

After the alignment is completed, the add and normalization processes are pipelined in the same way as it is done for prior art long operands. It should be noted that the data flow is needed in double width because of the fused multiply and add function.

Thus, according to the present invention a considerable performance gain can be achieved: only a pipelined latency of 3 for a "quad" precision (128 bit wide operands) addition in a "double" precision wide data flow is obtained according to the invention. This is accomplished using minimal additional hardware:

A) The hardware necessary for implementing the above-mentioned hold-AND and hold-OR function in a multiplexer upstream of the sum register;

B) The exponent of the C operand in a Multiply/Add logic circuit implementing A+(B*C) is forced to a constant to the exponent (i.e. 56), to get the correct alignment of the low part of the A operand, in other words, between the alignment for $A_{high}$ and for $A_{low}$, a fixed constant (here 56) is considered.

$A_{low}$ is aligned by the higher of these two values.

One possibility is, to save the shift amount, add a constant and use it for the second alignment step. Such an implementation could be timing critical, however. A preferred implementation allows simply calculating the shift amount again for the second alignment step.

In both cases it is the following calculation:

Shift amount=Exp B−Exp A+Exp C+K. (where K is an implementation specific different constant)

In the first alignment step we force Exp C to '0'. In the second alignment step we force Exp C to '56'. Exp A and Exp B are the Exponents of the Operands A and B and are identical in both calculations; and C) The exponent width to calculate the shift amount for the alignment has to be in extended width, which corresponds to 3 bits wider for binary operations.

Thus, according to the present invention a standard, prior art aligner unit can be used in combination with a "hold-OR" or "hold-AND" function to improve the execution of an extended add/subtract operation. Further, the usual, regularly used "narrow data flow" is minimally augmented with additional control logic (see above A) to C)) in order to cover the before-mentioned extended instructions, while achieving the advantage that a number of 10 of 13 cycles is saved according to the invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
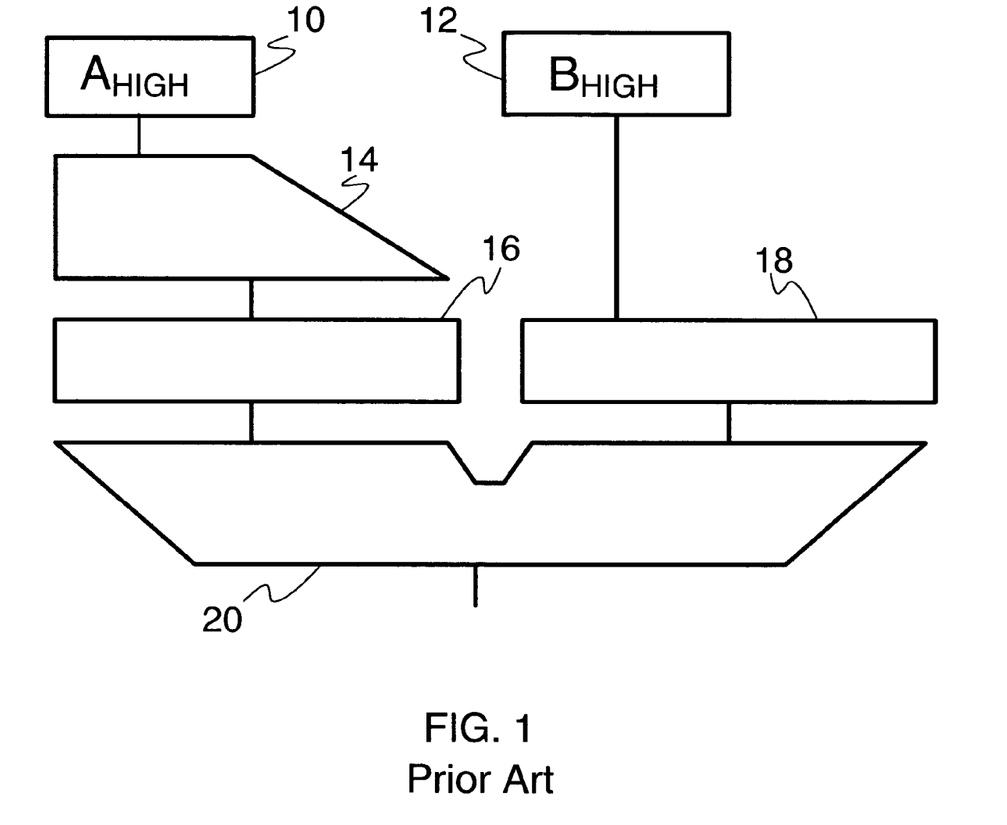
FIG. 1 illustrates a schematic, partial block diagram representation of a prior art fused multipy/ADD floating point unit focusing aligner and adder unit with respective input registers and their current settings in a start phase of a Floating Point Extended-Add Operation.

With general reference to the figures and with special reference now to FIG. 1 the extended floating-point operands A and B are added in a multiply/add unit, of which only the aligner and adder part is depicted including respective input registers in the drawing of FIG. 1.

A respective setting of registers is denoted in the accompanying drawings by the illustration of a respective operand part within a respective register.

In particular, the high part of the floating-point number mantissa A is loaded into input register 10 of aligner unit 14, and the high part of floating-point number mantissa B is loaded into input register 12 of a carry register 18. Input register 10 for $A_{high}$ has a length of 56 bit and is connected to the aligner unit 14. It should be noted, that in a preceding step the determination is made that the floating-point number A is less than the floating-point number B, i.e. that A must be aligned according to B.

Aligner unit 14 is connected to sum register 16, which is in turn connected to adder unit 20. Similarly, carry register 18 is connected with its input register 12. Carry register 18 is connected to adder unit 20.

Sum register 16 and carry register 18 each have a length of 2×56=112 bits in order to accommodate both low and high parts of A and B respectively in a concatenated form. In the start phase depicted in FIG. 1, sum register 16 and carry register 18 are still empty. This corresponds to prior art until now.

Figure 2:
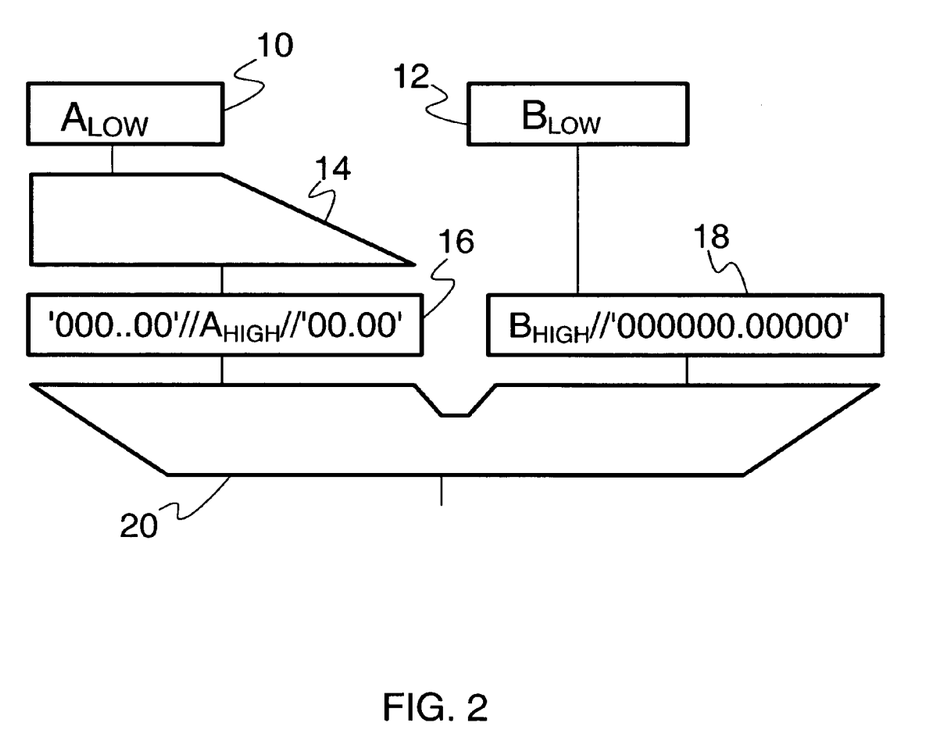
FIG. 2 illustrates an initial step of loading registers with the high portions of two operands in an add operation, per an embodiment of the present invention.

With further reference to FIG. 2, a first step of the inventive method of processing is illustrated. Here, the high part of floating-point number mantissa A ($A_{high}$) is shown aligned to the high part of B ($B_{high}$). In this aligned form the high part of A is moved into sum register 16, and the high part of B is moved into carry register 18. In the same cycle the low parts of A and B are loaded into input registers 10 and 12, respectively. The alignment of the low portion of A is performed using the same shift amount calculated for aligning the high part of A, plus a number of N bits reflecting the difference between bit positions of A high part and A low part. In general, N comprises the entire length of the high or low part, respectively. N can be selected for this exemplary embodiment as N=56 bit.

Figure 3:
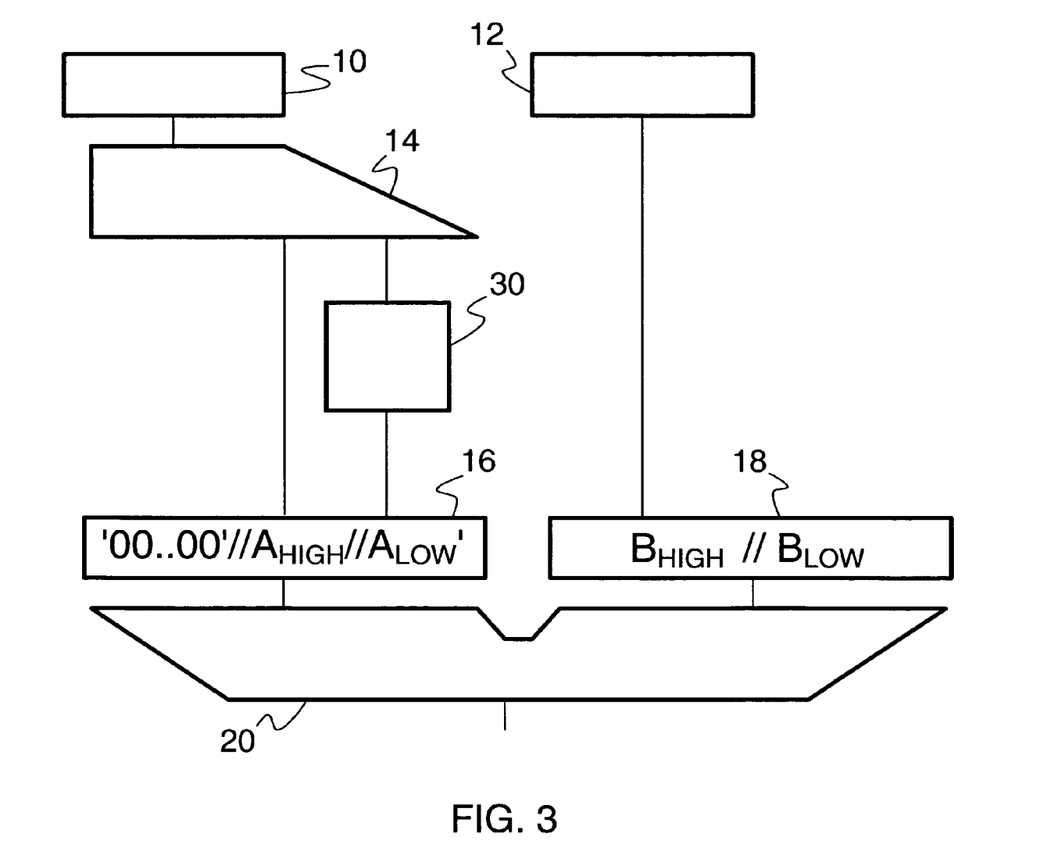
FIG. 3 illustrates a subsequent step of concatenating into registers the low portions of two operands, per an embodiment of the present invention.

With further reference now to FIG. 3, the low part of A, $A_{low}$, is shown moved into sum register 16 after having passed "Hold-OR/Hold-AND" logic 30 of the present invention. Hold-OR/Hold-AND 30 has the effect that the low bits of $A_{low}$ are cut-off and collected as sticky. In other words, logic 30 provides the ability to differentiate between floating-point intermediate results, which are precise or which have more bits below the considered precision. This information is needed to do a proper rounding.

The same time in the same cycle the low part of B, i.e. $B_{low}$ is concatenated to the high part of B in the carry register by a fixed multiplexing operation.

Figure 4:
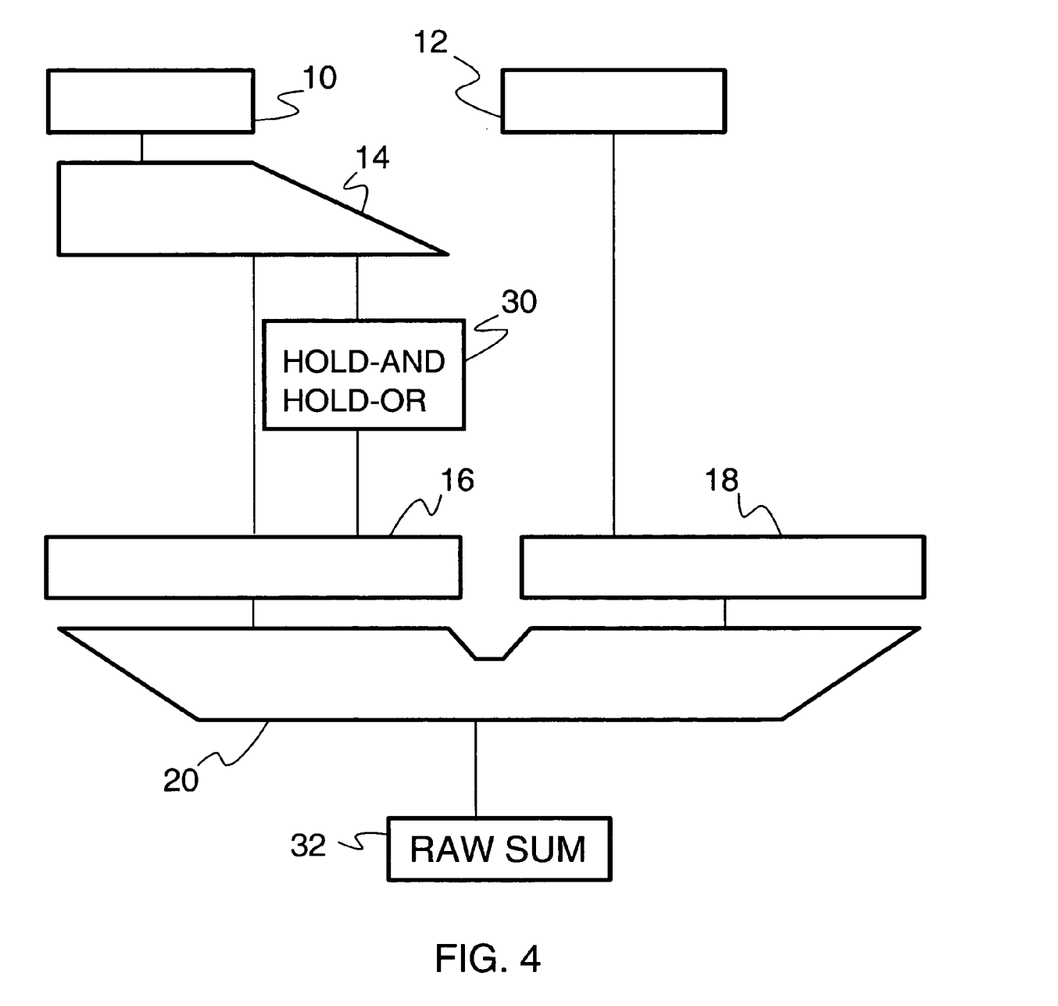
FIG. 4 illustrates a raw sum available in a register, per an embodiment of the present invention.

With further reference to FIG. 4, output register 32 of adder unit 20 is shown containing the result, depicted as "raw sum", which was built by adding the aligned A from sum register 16 and B from carry register 18 in main adder 20. Further steps of normalization and rounding of the raw sum generate the final result. Those steps, however, are not a focus of the present invention.

Figure 5:
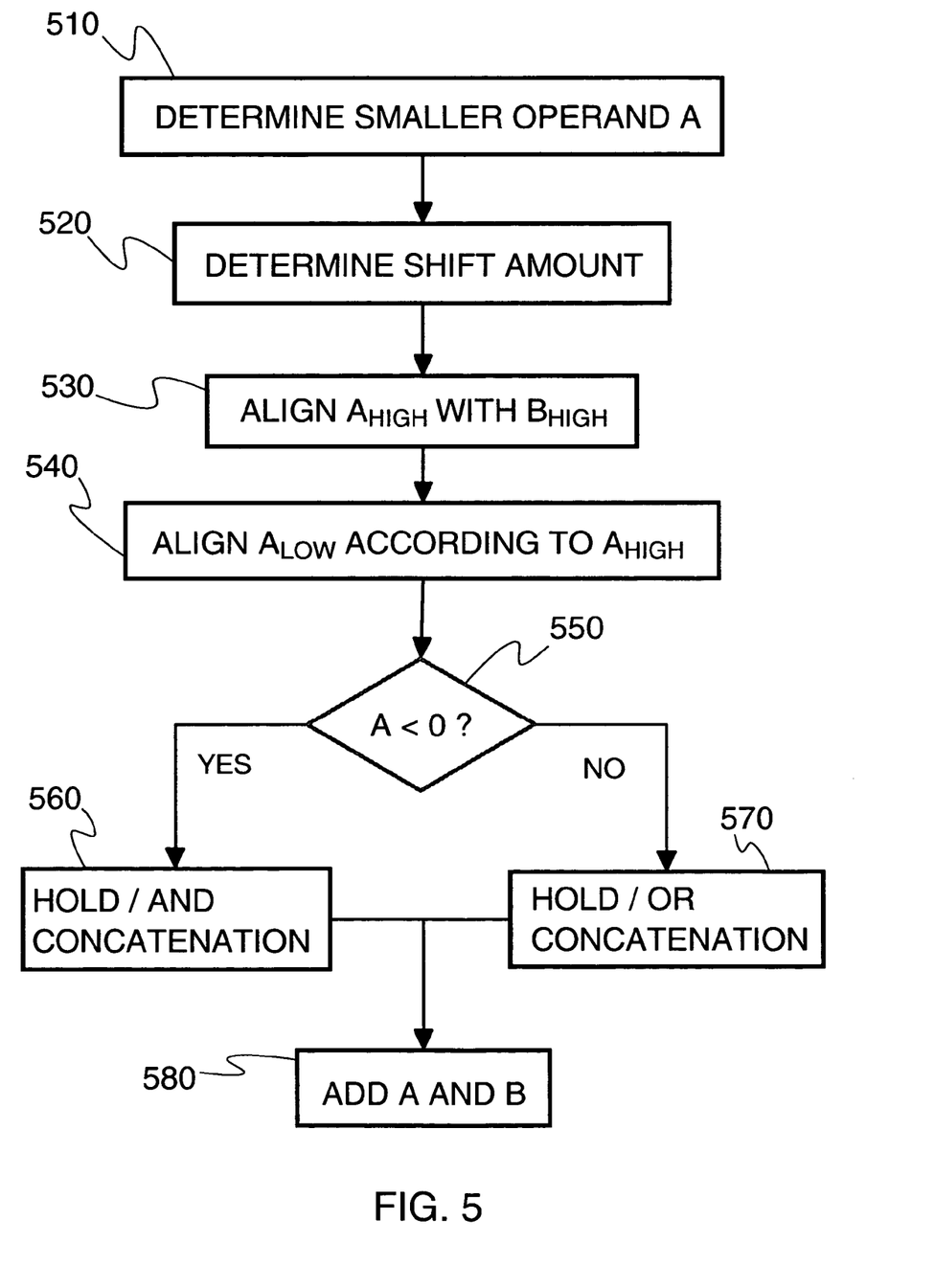
FIG. 5 illustrates an exemplary control flow corresponding to the processing illustrated in FIGS. 2 through 4, per an embodiment of the present invention.

With further reference to FIG. 5, the basics of a control flow according to a preferred embodiment of the present invention are now disclosed. FIG. 5 should be read in context with FIGS. 1 through 4. In a first step 510 the smaller operand is determined as operand A. In a next step 520 the shift amount is calculated, which is required for correct alignment of A to B. It should be noted that the calculation of the shift amount is adapted to the width of the exponents of A and B, respectively. Thus, in the case of extended instructions the double width, for example 16 instead of 8 is used. With this exception, prior art shift amount calculation logic can be used for this task.

In step 530 the high part of A, $A_{high}$, is aligned with the high part of floating-point number mantissa B. Then, in step 540 the low part of A, i.e. $A_{low}$, is aligned according to its high part $A_{high}$.

Then, in decision 550 it is determined if the mantissa of A is less than or equal to zero, i.e. negative. If YES, control flows to the YES-branch of decision 550, i.e. step 560, where according to the invention a hold-AND logic is used for concatenating the low part with the high part of operand A. In the NO-branch of decision 550, i.e. A is positive, control flows to step 570 where a hold-OR concatenation is provided according to the present invention.

Figure 6:
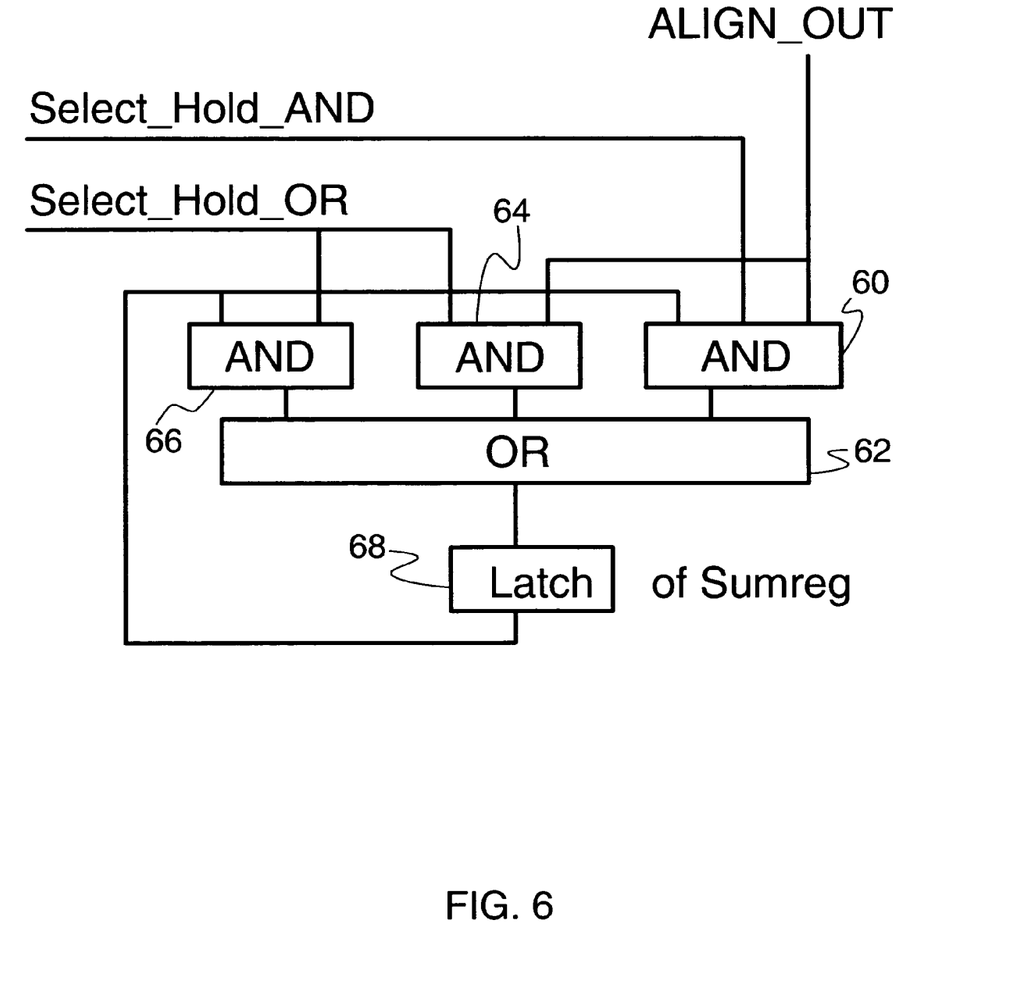
FIG. 6 illustrates a schematic circuit diagram depicting details of the hold/AND and hold/OR function per an embodiment of the present invention.

With additional reference to FIG. 6, the circuit implementing the inventive HOLD/OR and HOLD/AND function for concatenating the operand low and high parts is described next in regard to structure and function for a single bit of the above mentioned SUM register. Thus, in fact the schematic depicted in FIG. 6 is present 112 times for 112 bits, where the schematics are active concurrently.

As to its structure, a signal ALIGN_OUT is fed to two-port AND gate 60 together with a SELECT HOLD_AND signal and a feedback signal from latch 68. Further, the ALIGN_OUT signal is fed to AND gate 64. The output of AND gate 60 is fed to OR gate 62. A SELECT_HOLD_OR signal is fed as a second input to AND gate 64 and a further AND gate 66, of which the first input is the feedback output signal from latch 68. The output of AND 64 and AND 66 are also connected to the input of OR gate 62. The output of OR 62 is fed to latch 68.

The above mentioned control signals SELECT_HOLD_AND and SELECT_HOLD_OR are exclusive, they are never both active at the same time. Both may be '0' when no AXR instruction is executed. In case of an effective addition, the SELECT_HOLD_OR signal is used, i.e. is switched ON. Otherwise, for an effective subtraction, the SELECT_HOLD_AND is switched ON, i.e. is active.

Then, in a step 580 the concatenated floating-point number A is added in adder 20 to the floating-point number B, as described before.

It should be understood that the inventive principle of concatenating high and low part of floating-point number A can be used independently of the binary representation of A. Thus, the binary format according to the IEE standard mentioned above can be used as well as any standard of the HEX format.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of performing additive arithmetic operations on operands in a floating-point arithmetic unit, the operands including a first operand and a second operand, the first operand being a first floating-point number having a first mantissa, the second operand being a second floating-point number having a second mantissa, the second operand being greater than the first operand, the precision of the floating-point arithmetic unit exceeding the precision enabled by a bit length of data input to the floating-point arithmetic unit, said method comprising:

separating the first mantissa into a high portion and a low portion and separating the second mantissa into a high portion and a low portion;

loading the high portion of the first mantissa into a first operand register and loading the high portion of the second mantissa into a second operand register, the first and second operand registers each having a data width of N bits;

aligning the high portion of the first mantissa with the high portion of the second mantissa;

moving the aligned high portion of the first mantissa into a sum register and moving the high portion of the second mantissa into a carry register, said sum register and said carry register each having a data width of 2N bits;

concatenating in the carry register the low portion of the second mantissa with the high portion of the second mantissa;

aligning the low portion of the first mantissa in accordance with said aligning of the high portion of the first mantissa;

concatenating in the sum register the aligned low portion of the first mantissa with the aligned high portion of the first mantissa using a hold-function multiplexing circuit;

performing an additive arithmetic operation on the aligned first mantissa and the second mantissa in an adder, the adder having a data width of 2N bits.

2. The method of claim 1, wherein said floating point arithmetic unit is a fused multiply/add circuit.

3. The method of claim 1, wherein the additive arithmetic operation is an effective addition, and the hold-function is a hold-OR function.

4. The method of claim 1, wherein the additive arithmetic operation is an effective subtraction, and the hold-function is a hold-AND function.

5. The method of claim 1, wherein said moving the aligned high portion of the first mantissa into a sum register, said moving the high portion of the second mantissa into a carry register, and said aligning the low portion of the first mantissa are performed during a single clock cycle.

6. The method of claim 5, performed in three clock cycles.

7. An apparatus for performing additive arithmetic operations on operands in a floating-point arithmetic unit, the operands including a first operand and a second operand, the first operand being a first floating-point number having a first mantissa, the second operand being a second floating-point number having a second mantissa, the second operand being greater than the first operand, the precision of the floating-point arithmetic unit exceeding the precision enabled by a bit length of data input to the floating-point arithmetic unit, said apparatus comprising:

means for separating the first mantissa into a high portion and a low portion and separating the second mantissa into a high portion and a low portion;

means for loading the high portion of the first mantissa into a first operand register and loading the high portion of the second mantissa into a second operand register, the first and second operand registers each having a data width of N bits;

means for aligning the high portion of the first mantissa with the high portion of the second mantissa;

means for moving the aligned high portion of the first mantissa into a sum register and moving the high portion of the second mantissa into a carry register, said sum register and said carry register each having a data width of 2N bits;

means for concatenating in the carry register the low portion of the second mantissa with the high portion of the second mantissa;

means for aligning the low portion of the first mantissa in accordance with said aligning of the high portion of the first mantissa;

a hold-function multiplexing circuit, said circuit concatenating in the sum register the aligned low portion of the first mantissa with the aligned high portion of the first mantissa;

an adder, said adder performing an additive arithmetic operation on the aligned first mantissa and the second mantissa, the adder having a data width of 2N bits.

8. The apparatus of claim 7, wherein said floating point arithmetic unit is a fused multiply/add circuit.

9. The apparatus of claim 7, wherein the additive arithmetic operation is an effective addition, and the hold-function is a hold-OR function.

10. The apparatus of claim 7, wherein the additive arithmetic operation is an effective subtraction, and the hold-function is a hold-AND function.

11. A floating point arithmetic unit for performing additive arithmetic operations on operands, the operands including a first operand and a second operand, the first operand being a first floating-point number having a first mantissa, the second operand being a second floating-point number having a second mantissa, the second operand being greater than the first operand, the first and second mantissas each being separated into a low portion and a high portion, the precision of the floating-point arithmetic unit exceeding the precision enabled by a bit length of data input to the floating-point arithmetic unit, said floating point arithmetic unit comprising:

first and second operand registers, said operand registers each having a data width of N bits, said first operand register initially loaded with the high portion of the first mantissa, said second operand register initially loaded with high portion of the second mantissa;

an aligner for aligning the high portion of the first mantissa with the high portion of the second mantissa and for aligning the low portion of the first mantissa in accordance with the aligning of the high portion of the first mantissa;

a carry register for containing a concatenation of the high portion of the second mantissa with the low portion of the second mantissa;

a sum register, the sum register first loaded with the aligned high portion of the first mantissa;

a hold-function circuit, said circuit concatenating in the sum register the aligned low portion of the first mantissa with the aligned high portion of the first mantissa;

an adder, said adder performing an additive arithmetic operation on the aligned first mantissa and the second mantissa, wherein the sum register, carry register, and adder each have a data width of 2N bits.

12. The floating point arithmetic unit of claim 11, wherein said floating point arithmetic unit is a fused multiply/add circuit.

13. The floating point arithmetic unit of claim 11, wherein the additive arithmetic operation is an effective addition, and the hold-function is a hold-OR function.

14. The floating point arithmetic unit of claim 11, wherein the additive arithmetic operation is an effective subtraction, and the hold-function is a hold-AND function.

* * * * *